US008954579B2

(12) United States Patent
Do et al.

(10) Patent No.: US 8,954,579 B2
(45) Date of Patent: Feb. 10, 2015

(54) TRANSACTION-LEVEL HEALTH MONITORING OF ONLINE SERVICES

(75) Inventors: Minh Quang Anh Do, Redmond, WA (US); Dong Cao, Redmond, WA (US); Mahesh Dudgikar, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 202 days.

(21) Appl. No.: 13/591,029

(22) Filed: Aug. 21, 2012

(65) Prior Publication Data

US 2014/0059199 A1   Feb. 27, 2014

(51) Int. Cl.
G06F 15/16 (2006.01)
(52) U.S. Cl.
USPC ............ 709/224; 709/206; 709/227; 370/352
(58) Field of Classification Search
CPC ............... H04L 29/06027; H04L 41/5009; H04L 47/10; H04L 12/1818; H04L 29/06; H04L 41/00; H04L 41/0896; G06F 15/16
USPC .................................. 709/206, 227; 370/352
See application file for complete search history.

(56) References Cited

U.S. PATENT DOCUMENTS

| | | | | |
|---|---|---|---|---|
| 7,023,979 | B1* | 4/2006 | Wu et al. | 379/265.11 |
| 7,991,729 | B2* | 8/2011 | Falash et al. | 706/62 |
| 8,082,169 | B2* | 12/2011 | Crew et al. | 705/7.26 |
| 2005/0027566 | A1* | 2/2005 | Haskell | 705/2 |
| 2006/0005140 | A1* | 1/2006 | Crew et al. | 715/760 |
| 2008/0026348 | A1* | 1/2008 | Falash et al. | 434/219 |
| 2009/0006614 | A1 | 1/2009 | Le et al. | |
| 2009/0006897 | A1 | 1/2009 | Sarsfield | |
| 2009/0307651 | A1* | 12/2009 | Senthil et al. | 717/102 |
| 2010/0242048 | A1* | 9/2010 | Farney et al. | 718/104 |
| 2010/0269164 | A1 | 10/2010 | Sosnosky et al. | |
| 2011/0010159 | A1 | 1/2011 | Birch et al. | |
| 2011/0107364 | A1* | 5/2011 | Lajoie et al. | 725/25 |
| 2011/0126197 | A1 | 5/2011 | Larsen et al. | |

(Continued)

OTHER PUBLICATIONS

Joseph, Joshy, "Patterns for High Availability, Scalability, and Computing Power with Windows Azure", Published on: Apr. 24, 2009, Available at: http://msdn.microsoft.com/en-us/magazine/dd727504.aspx.

(Continued)

*Primary Examiner* — Tesfay Yohannes
(74) *Attorney, Agent, or Firm* — Nicholas Chen; David Andrews; Micky Minhas

(57) ABSTRACT

Embodiments are directed to verifying the accessibility and functionality of an online service and to scheduling the automatic execution of an online service. In one scenario, a computer system receives online service workflows and corresponding expected outcomes for each workflow. Each online service workflow is associated with an online service, and each online service workflow includes workflow steps that cause the online service to perform specified operations that produce observable outcomes within a specified amount of time specified by the online service provider. The computer system executes at least one of the received online service workflows and abandons execution of the online service workflow if execution is not completed within the specified amount of time. The computer system also compares the outcomes of the workflow execution to the expected outcomes corresponding to the executed online service workflow and generates a report that includes the results of the comparison.

17 Claims, 3 Drawing Sheets

(56) References Cited

U.S. PATENT DOCUMENTS

| | | |
|---|---|---|
| 2011/0131499 A1 | 6/2011 | Ferris et al. |
| 2011/0138050 A1 | 6/2011 | Dawson et al. |
| 2011/0276951 A1 | 11/2011 | Jain |
| 2011/0289440 A1 | 11/2011 | Carter et al. |
| 2012/0042055 A1 | 2/2012 | Agarwala et al. |
| 2012/0059919 A1 | 3/2012 | Glaser et al. |
| 2013/0013704 A1* | 1/2013 | Pope et al. .................... 709/206 |
| 2014/0059199 A1* | 2/2014 | Do et al. ........................ 709/224 |
| 2014/0100912 A1* | 4/2014 | Bursey ......................... 705/7.27 |

OTHER PUBLICATIONS

"Failover & Load Balancing", Retrieved on: Mar. 14, 2012, Available at: http://www.vmware.com/technical-resources/virtualization-topics/high-availability/load-balancing/load-balancing.html.

"International Search Report & Written Opinion for PCT Patent Application No. PCT/US2013/055228", Mailed Date: Jun. 30, 2014, Filed Date: Aug. 16, 2013, 12 Pages.

* cited by examiner

US 8,954,579 B2

TRANSACTION-LEVEL HEALTH MONITORING OF ONLINE SERVICES

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications may be designed to run on the cloud. These applications are provided to many different users as well as many different types of users. In some cases, these cloud-provided applications may be unreliable or unavailable, which may lead to a decrease in productivity by the application's users.

BRIEF SUMMARY

Embodiments described herein are directed to verifying the accessibility and functionality of an online service and to scheduling the automatic execution of an online service. In one embodiment, a computer system receives from an online service provider one or more online service workflows as well as corresponding expected outcomes for each workflow. Each online service workflow is associated with an online service, and each online service workflow includes various workflow steps that cause the online service to perform specified operations that produce observable outcomes within a specified amount of time specified by the online service provider. The computer system executes at least one of the received online service workflows and abandons execution of the online service workflow if execution is not completed within the specified amount of time. The computer system also compares the outcomes of the workflow execution to the expected outcomes corresponding to the executed online service workflow and generates a report that includes the results of the comparison.

In another embodiment, a computer system schedules the automatic execution of an online service. The computer system performs the steps outlined above including receiving online service workflows and corresponding expected outcomes for each workflow, executing at least one of the received online service workflows and abandoning execution of the online service workflow if execution is not completed within the specified amount of time, comparing the outcomes of the workflow execution to the expected outcomes corresponding to the executed online service workflow and generating a report that includes the results of the comparison. The computer system also instantiates a scheduler to assign one or more online service workflows to at least one of the networked computers for automatic execution on a specified basis. In other embodiments, the computer system further monitors the ongoing execution of online service workflows to determine whether the online service workflows are being executed properly.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
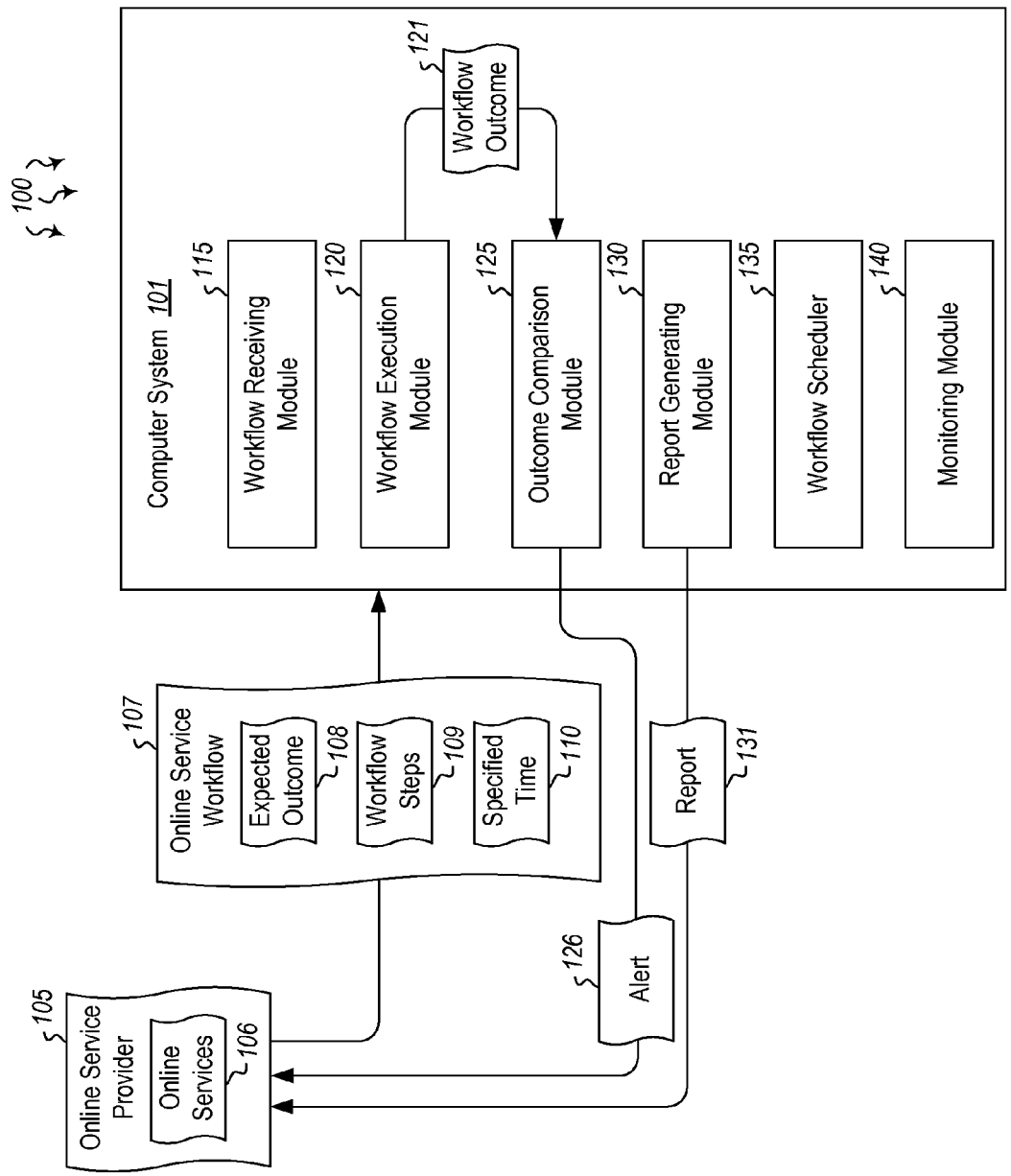
FIG. 1 illustrates a computer architecture in which embodiments described herein may operate including verifying the accessibility and functionality of an online service and scheduling the automatic execution of an online service.

Embodiments described herein are directed to verifying the accessibility and functionality of an online service and to scheduling the automatic execution of an online service. In one embodiment, a computer system receives from an online service provider one or more online service workflows as well as corresponding expected outcomes for each workflow. Each online service workflow is associated with an online service, and each online service workflow includes various workflow steps that cause the online service to perform specified operations that produce observable outcomes within a specified amount of time specified by the online service provider. The computer system executes at least one of the received online service workflows and abandons execution of the online service workflow if execution is not completed within the specified amount of time. The computer system also compares the outcomes of the workflow execution to the expected outcomes corresponding to the executed online service workflow and generates a report that includes the results of the comparison.

In another embodiment, a computer system schedules the automatic execution of an online service. The computer system performs the steps outlined above including receiving online service workflows and corresponding expected outcomes for each workflow, executing at least one of the received online service workflows and abandoning execution of the online service workflow if execution is not completed within the specified amount of time, comparing the outcomes of the workflow execution to the expected outcomes corresponding to the executed online service workflow and generating a report that includes the results of the comparison. The computer system also instantiates a scheduler to assign one or more online service workflows to at least one of the networked computers for automatic execution on a specified basis. In other embodiments, the computer system further monitors the ongoing execution of online service workflows to determine whether the online service workflows are being executed properly.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments described herein can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that various embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments described herein may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

Additionally or alternatively, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and other types of programmable hardware.

FIG. 1 illustrates a computer architecture 100 in which at least one embodiment may be employed. Computer architecture 100 includes computer system 101. Computer system 101 may be any type of local or distributed computer system, including a cloud computing system. The computer system includes various modules for performing a variety of different functions. For instance, workflow receiving module 115 may receive online service workflows 107 from an online service provider 105. The online service provider 105 may be any type of user, business organization or other entity that provides an online service (e.g. 106). The online service may be any type of functionality provided over the internet (e.g. websites, email services, shopping functionality, etc.). The online service may be a single service, or may incorporate many other applications or services.

The online service workflow 107 may be executed by workflow execution module 120. The outcome of the workflow 121 may be compared to an expected outcome 108 provided by the online service provider 105 by outcome comparison module 125. The results of the comparison may be compiled into a report 131 by report generating module 130. Other modules such as the workflow scheduler 135 and the monitoring module 140 will be explained further below.

In some cases, the online services 106 provided by the online service provider 105 may need to meet certain reliability metrics and minimize down time. This may be especially true for those online service used in production systems or those services that cater to enterprise customers. Various tools may be used to monitor the performance and availability of computer systems (also referred to as "machines" herein)

hosting the online services to ensure a (relatively) high up time. These tools may raise alerts when a service becomes unavailable. In some cases, however, a service may be available or reachable, but at the same time in a faulty state that prevents the service from operating correctly (i.e. in the manner explained to the customer).

The computer system 101 may implement its various modules to provide a cloud transaction monitoring (CTM) system. The CTM system may be configured to monitor online services and ensure they are available or reachable. The CTM system may also monitor each online service's operation at the transactional level. At least in some embodiments, the CTM system has a flexible plug-in model that allows engineers, quality assurance personnel or other users to design complex test modules that simulate customers' real or simulated workflows (e.g. 107), as well as describe the expected outcomes 108 from running these workflows. The plug-in model allows test modules to be accessed directly from a developer's (nightly) build drop and imported to the CTM system with little or no modification needed. The CTM system will run the test modules periodically or on demand, and raise alerts if a workflow does not complete successfully or if the expected outcomes aren't reached. After the execution of a workflow, the CTM system may be able to provide a preliminary diagnostic of what went wrong and assist users (e.g. developers in restoring service functionality).

Thus, as mentioned above, the CTM system may monitor the health of an online service at the transactional level. As such, the CTM system verifies both service availability and functionality. Various requests are sent to the online service that together simulate a customer's workflow (e.g. 107), and verify that expected outcomes are observed. When expected outcomes are not reached as a result of running the workflow, alerts may be raised automatically to the online service provider by propagating messages through a communication system.

In some embodiments, a dedicated thread may be used to periodically poll the CTM system for pending schedules, and decide whether to acquire the schedules according to a specified scheduling algorithm. To load balance the scheduling of workflow execution, certain preferences may be used, including the following: workflows that require the fewest modification in the current configuration of a CTM worker machine are more preferable to that worker, and workflows that do not require locking down the computer system are preferable to all workers. At least in some cases, acquiring schedules is first-come-first-served. After a schedule is acquired by a CTM worker, it can no longer be acquired by other workers. Schedules may thus be processed according to their preferability.

A workflow may require the CTM worker machine that runs it to have a certain configuration, including a specific operating system version, specially configured system settings, or additional custom software. CTM worker machines may be initially deployed with a standard, common configuration, which each worker then modifies based on the configuration requirement of each workflow that is acquired for execution. Additionally or alternatively, some CTM worker machines may be initially deployed with the configuration required by a specific workflow. In both implementations, for the purpose of allocating pending workflows to the CTM worker pool, the scheduler 135 will match workflows to the CTM workers that have the same or substantially similar configuration.

A number of heuristics may be used to determine the configuration cost of a particular workflow to each CTM worker. One heuristic is the number of configuration steps (removal of existing software, installation of required software, applying special system settings, or loading a preconfigured image of the desired system configuration) that are involved in modifying a CTM worker's configuration to the desired configuration. Each configuration step may be assigned an approximate cost value that represents (in some cases roughly) how long it takes to perform that step. For example, applying a system setting to open a port on a worker machine may cost 1 unit, while installing a large piece of custom software costs 10 units and loading an image of the desired system configuration costs 12 units. The summed costs of all configuration steps necessary to modify a CTM worker machine to the configuration required by a workflow represent that workflow's configuration cost to that CTM worker. Workflows that require the fewest modifications in a CTM worker's configuration (i.e. have the lowest configuration cost) are preferable to that worker. In a different implementation, the scheduler 135 may include a subsystem that tracks in real time units the cost of each configuration step, and allocates schedules accordingly.

The workflow scheduler 135 may be used to control scheduling of online service workflow execution. Each workflow may be referred to as a "job". The workflow scheduler may thus poll for jobs to assign for execution. A job polling thread may be instantiated which is regulated according to a worker pool where one charge is debited from the pool whenever a schedule is acquired, and credited back when the job is released. The worker pool may block the job polling thread if there is no charge left. To allow for cases where exclusive execution is desired, an exclusive execution lock may be activated which blocks the job polling thread whenever an exclusive schedule is acquired. The lock will be released when the schedule is released. Each schedule is assigned a release signal when it is started. When the schedule is released, the signal is activated. When an exclusive schedule is acquired, it waits for all existing signals to be activated before it can start.

In some embodiments, a master lock may be activated when a schedule is acquired that requires a change in the current computer system's configuration. No schedule may be executed when the master lock is activated, and the job polling thread is prevented from acquiring new schedules. In addition to executing each workflow concurrently in a separate thread, the CTM system also allocates a separate address space for each workflow. This will be done by creating an application domain or virtual sandbox for each online service workflow that can be unloaded upon completion, or at any time when one or more specified conditions are met.

In cases where the CTM system cannot contact a certain online service after a specified number of retries, the workflow execution module 120 the will enter a fault state. The workflow execution module will maintain an open connection on the computer system 101. If the online service is unreachable, or if the workflow execution module has entered a fault state, the CTM system will attempt to restart or reschedule the service.

The CTM system also includes a flexible plug-in model that enables online services with complex logic to be designed and run on schedule or on demand. These services are run on a scalable scheduler that enables work to be distributed among a cluster of computer systems. Once a desired configuration has been determined for running a particular workflow, computer systems may be automatically provisioned with that configuration. These and other concepts mentioned above will be explained further below with regard to FIGS. 2 and 3.

Figure 2:
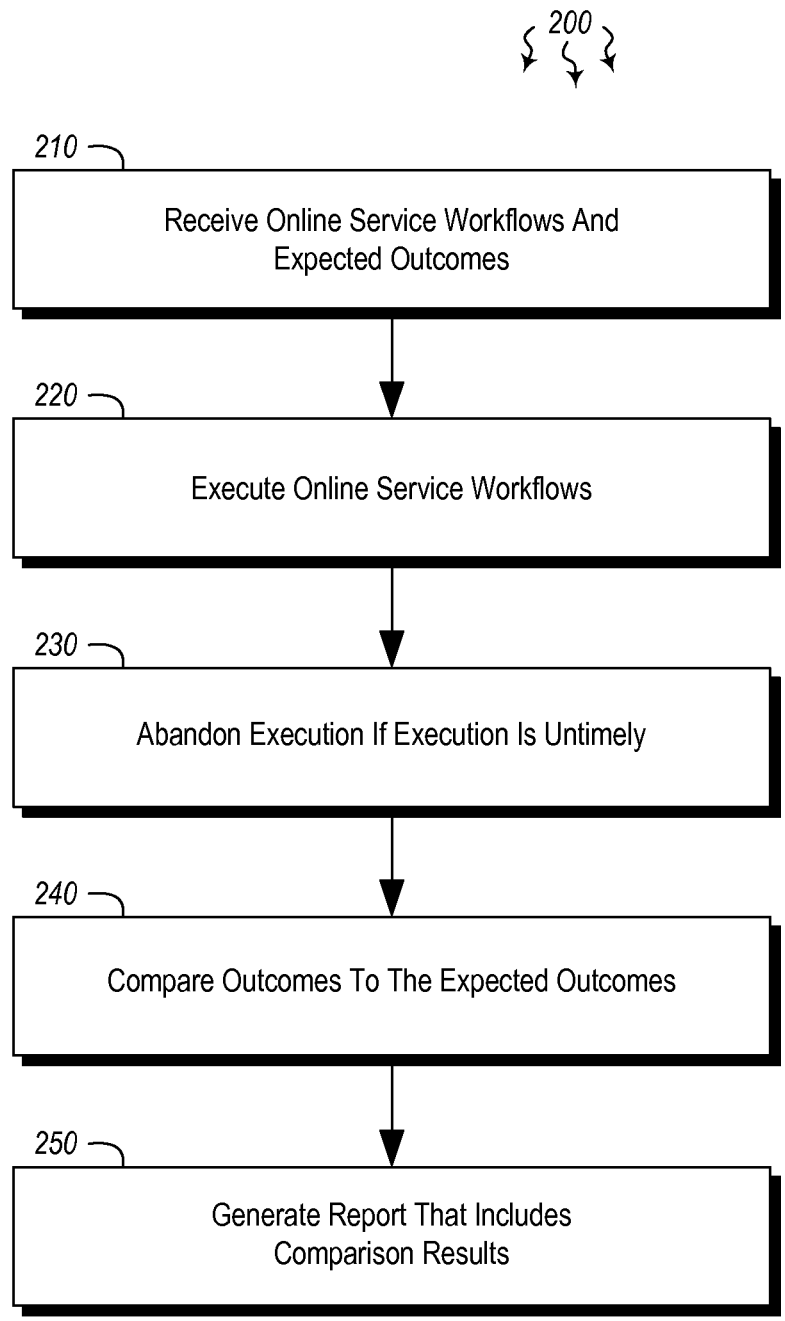
FIG. 2 illustrates a flowchart of an example method for verifying the accessibility and functionality of an online service.
Figure 3:
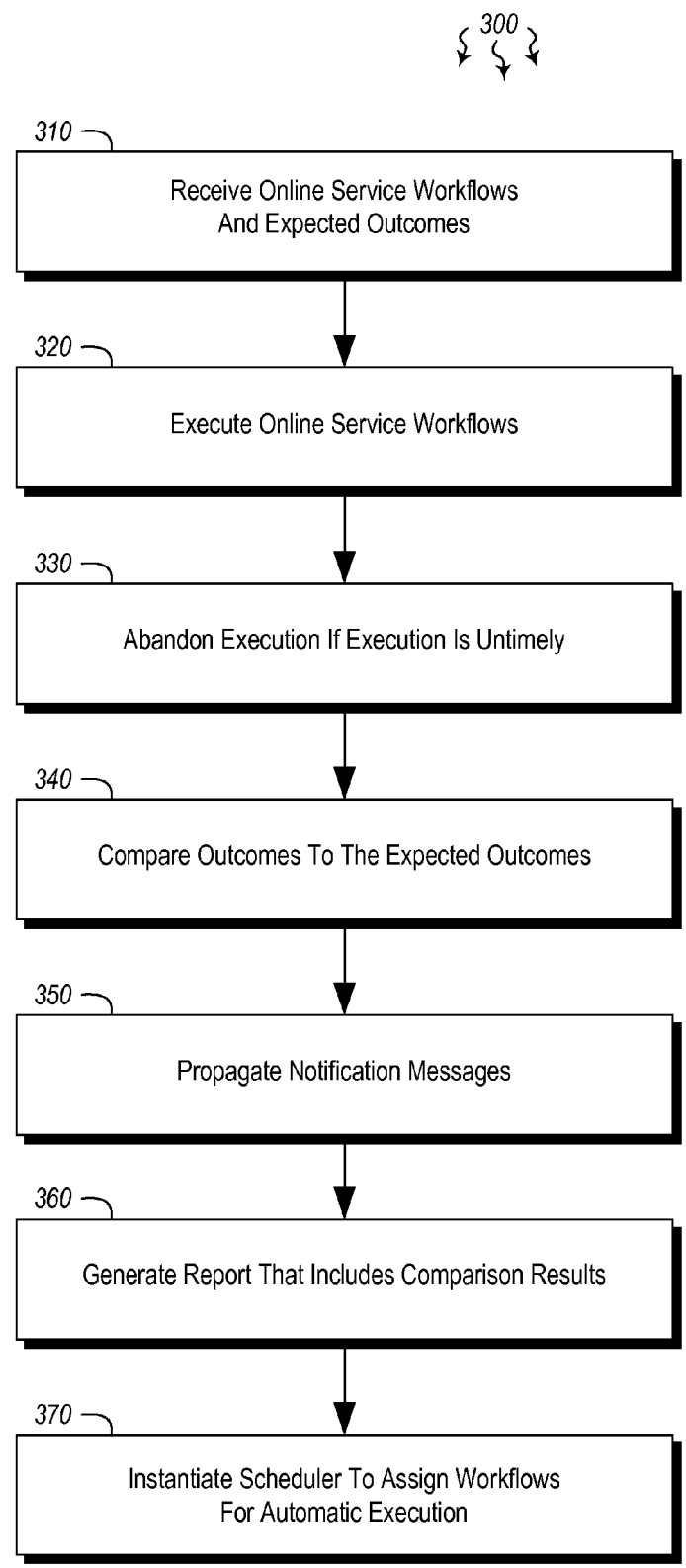
FIG. 3 illustrates a flowchart of an example method for scheduling the automatic execution of an online service.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for verifying the accessibility and functionality of an online service. The method 200 will now be described with frequent reference to the components and data of environment 100.

Method 200 includes an act of receiving from an online service provider one or more online service workflows and one or more corresponding expected outcomes for each workflow, each online service workflow being associated with an online service, wherein each online service workflow includes one or more workflow steps that cause the online service to perform one or more specified operations that produce observable outcomes within a specified amount of time specified by the online service provider (act 210). For example, workflow receiving module 115 of computer system 101 may receive online service workflow 107 and expected outcome 108. The expected outcome may indicate certain results, a certain state or a certain output that is to be attained by executing the workflow. The online service provider 105 may also send a specified time 110 in which the workflow's steps 109 are to be executed. The workflow steps are designed to perform a certain function (or functions) when executed.

Once the online service workflow 107 is received by the workflow receiving module 115, the workflow executing module 120 may execute the received online service workflow (act 220). If execution of the online service workflow is not completed within the time 110 specified by the online service provider 105, execution of the online service workflow 107 will be abandoned (act 230). If execution is completed within the specified time, the workflow's outcome 121 will be sent to the outcome comparison module 121 which compares the outcomes of the workflow's execution to the expected outcomes 108 corresponding to the executed online service workflow (act 240).

Then, the results of the comparison are used by the report generating module 130 to generate report 131 (act 250). In some embodiments, the generated report may be stored on any one or more of the following: a computer-readable storage media, an information retrieval system and a communication system accessible by the online service provider 105. If the workflow outcome 121 is the same as or is substantially similar to the expected outcome 108, the report will indicate that the workflow worked (or substantially worked) as intended. If the actual and expected outcomes do not match up, the report will indicate that the workflow did not work as intended. In some embodiments, a threshold may be provided by the online service provider indicating when a comparison is similar enough or dissimilar enough to warrant an indication that the workflow worked or did not work as intended.

The CTM system may determine, in some cases, that the generated report includes an indication that the results of the workflow execution did not match the expected results for at least one online service workflow (whether by a threshold or some other determination). The CTM system may indicate to the online service provider 105 that the expected results 108 were not reached, and may further propagate messages (e.g. alert 126) through one or more communication systems indicating which step of the workflow generated the error.

As mentioned above, one or more computer systems may be (automatically) provisioned in preparation for executing the online service workflows. The provisioning may include any of the following: adjusting computer system settings, installing custom software used by the workflow and removing software incompatible with the online service workflow. Schedulers may be used to assign workflows to the (automatically provisioned) networked computers for automatic execution on a periodic basis or on-demand basis. A number of heuristics, as described above, may be implemented in the scheduler to assign workflows to computers so that the time cost of provisioning computer systems for workflow execution is minimized. The scheduler may assign workflows to computers so that the amount of time between each workflow's scheduled execution start time and its actual execution start time is minimized.

Thus, in one embodiment, an online service provider (e.g. 105) may upload one or more packages to a cloud storage service so that the packages are accessible to the CTM system. A user (or group of users) may configure the workflow for periodic execution. Each schedule may need different machine setup configurations to be applied before it is run. The CTM system may allow each CTM worker role to pick among pending schedules the schedule that most closely matches its current configuration state. A central scheduler use the CTM system to keep and frequently update meta-information about the CTM's overall workload, as well as each CTM module's workload and current machine configuration (to minimize the amount of time required to install and uninstall custom software). In some cases, a decentralized scheduling system may be implemented, where each CTM worker knows its own machine configuration and workload, and picks schedules on a best efforts basis. This may alleviate the need to keep meta-information. Apart from keeping track of which schedule is currently acquired by which CTM worker, a decentralized scheduling system is effectively stateless. Each CTM worker role is responsible for knowing its own state and acquires more work when appropriate.

A plug-in model may be implemented that allows a plurality of different and arbitrary workflow types to be executed by the computer system and further allows online service workflow instructions from build drops to be executed by the computer system. The plug-in may vary depending on which service is to be monitored. The CTM system carries out the tests in the plug-in and that allows the CTM system to test the online service workflow. In some cases, an online service provider may provide one or more parameters to an online service workflow at runtime to modify the workflow's behavior at runtime. The workflow's behavior is then modified at runtime without having to redeploy the workflow.

The CTM system may, in some cases, detect that a computer among the cluster of networked computers has entered a fault state and has become unfit for workflow execution. A number of methods may be employed for this detection, including having each networked computer to send a "heartbeat" signal at specified time intervals. When it is detected that a machine has faulted, the CTM system may send a reset command to that machine to restore it to a functional state. If the reset command fails to place the computer system in a functional state, the CTM system may prevent the computer system from acquiring further online service workflows for execution until it has been repaired.

FIG. 3 illustrates a flowchart of a method 300 for scheduling the automatic execution of an online service. The method 300 will now be described with frequent reference to the components and data of environment 100.

Method 300 includes an act of receiving from an online service provider one or more online service workflows and one or more corresponding expected outcomes for each workflow, each online service workflow being associated with an online service, wherein each online service workflow includes one or more workflow steps that cause the online service to perform one or more specified operations that produce observable outcomes within a specified amount of time specified by the online service provider (act 310). Thus, as above, online service provider 105 may send online service workflow 107 and the expected outcome 108 to the workflow receiving module 115 of computer system 101. The workflow execution module 120 then executes the received online service workflow (act 320). If execution is not completed within the specified amount of time (110), execution of the online service workflow is abandoned (act 330).

The outcome comparison module 125 compares the outcome of the workflow execution (121) to the received expected outcome (108) corresponding to the executed online service workflow (act 340). Then, if one or more of the expected outcomes was not reached, the outcome comparison module 125 may send a real-time alert 126 to the online service provider 105 indicating that at least one expected outcome was not reached (act 350). The alert 126 may also indicate which step of the workflow generated the error. Furthermore, based on the comparison, the report generating module 130 generates a report 131 that includes the results of the comparison (act 360). The computer system 101 also instantiates a workflow scheduler 135 to assign one or more online service workflows 107 to at least one networked computer for automatic execution on a specified (periodic or on-demand) basis (act 370). Various software dependencies may be pre-installed on the network computer to which the online service workflow was assigned. The online service workflow may be executed according to the assigned schedule. The online service workflow may then be used to validate an online service in the staging environment, or may be deployed to monitor the online service continuously in the production environment.

In some cases, an online service may first be deployed to a staging or test environment before being switched to the production environment. In the staging environment, the online service is typically not available to customers or to the public. Quality assurance personnel may perform a number of functional and user interface tests to ensure that the service has been deployed correctly and can perform customer scenarios and other tasks as expected. An online service workflow that simulates customer scenarios is executed, its outcome is compared to the expected outcome, and a report is generated that includes the results of the comparison indicating to the online service provider whether the online service has been deployed successfully and can perform customer scenarios as designed.

In some embodiments, monitoring module 140 may be used to monitor the ongoing execution of online service workflows to determine whether the online service workflows are being executed properly. The monitoring module can determine if errors or faults are occurring, or if execution is otherwise different than it should be. The monitoring may be continuous, or may occur at certain specified or periodic instances. After an online service has been switched from staging to the production environment, the monitoring module may continually monitor the availability and functionality of the service by simulating an end-to-end customer workflow. The online service thus performs the operations defined in the workflows if the service is accessible, functional and has available capacity. The online service workflows may be received from a single software application or from multiple different applications. Thus, workflows may be reused by different applications that share similar functionality.

Accordingly, methods, systems and computer program products are provided which verify the accessibility and functionality of an online service at a periodic or on-demand basis. Moreover, methods, systems and computer program products are provided which schedule the automatic execution of online service workflows.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computing system of one or more networked computers, each computer comprising the following:

one or more processors;

system memory;

one or more computer-readable storage media having stored thereon computer-executable instructions that, when executed by the one or more processors, cause the computing system to perform a method for verifying the accessibility and functionality of an online service, the method comprising the following:

an act of receiving from an online service provider one or more online service workflows and one or more corresponding expected outcomes for each workflow, each online service workflow being associated with an online service, wherein each online service workflow includes one or more workflow steps that cause the online service to perform one or more specified operations that produce observable outcomes within a specified amount of time specified by the online service provider;

an act of executing at least one of the received online service workflows;

an act of abandoning execution of the online service workflow if execution is not completed within the specified amount of time;

an act of comparing the outcomes of the workflow execution to the expected outcomes corresponding to the executed online service workflow; and an act of generating a report that includes the results of the comparison, wherein a scheduler is implemented to assign one or more online service workflows to at least one of the networked computers for automatic execution on a periodic basis.

2. The computer system of claim 1, further comprising storing the generated report on one or more of the following: a computer-readable storage media, an information retrieval system and a communication system accessible by the online service provider.

3. The computer system of claim 1, further comprising:
an act of determining that the generated report includes an indication that the results of the workflow execution did not match the expected results for at least one online service workflow; and
an act of indicating to the online service provider that the expected results were not reached, including propagating a message through one or more communication systems.

4. The computer system of claim 1, further comprising an act of provisioning one or more computers in preparation for executing at least one of the online service workflows.

5. The computer system of claim 4, wherein provisioning includes at least one of the following: adjusting computer system settings, installing custom software used by the workflow, removing software incompatible with the online service workflow, or loading a preconfigured image that includes one or more software dependencies and adjusted settings used by the workflow.

6. The computer system of claim 1, wherein a scheduler is implemented to assign one or more workflows to a computer for execution on an on-demand basis.

7. The computer system of claim 1, wherein a heuristic is implemented in the scheduler to assign workflows to computers such that the time cost of provisioning computers for workflow execution is minimized.

8. The computer system of claim 1, wherein the scheduler assigns workflows to computers such that the amount of time between each workflow's scheduled execution start time and its actual execution start time is minimized.

9. The computer system of claim 1, wherein a plug-in model is implemented that allows a plurality of different and arbitrary workflow types to be executed by the computer system and further allows online service workflow instructions from build drops to be executed by the computer system.

10. The computer system of claim 1, further comprising providing one or more parameters to an online service workflow at runtime to modify the workflow's behavior.

11. The computer system of claim 10, wherein the workflow's behavior is modified at runtime without having to redeploy the workflow.

12. The computer system of claim 1, further comprising:
an act of detecting that a computer in the system of networked computers has become unfit for workflow execution; and
an act of initiating a reset command on the computer system that resets the computer system to a functional state.

13. The computer system of claim 12, further comprising:
an act of determining that the reset command failed to place the computer system in a functional state; and
an act of preventing the computer system from acquiring online service workflows for execution.

14. A system of one or more networked computers, each computer comprising the following:
one or more processors;
system memory;
one or more computer-readable storage media having stored thereon computer-executable instructions that, when executed by the one or more processors, cause the computing system to perform a method for scheduling the automatic execution of an online service, the method comprising the following:
an act of receiving from an online service provider one or more online service workflows and one or more corresponding expected outcomes for each workflow, each online service workflow being associated with an online service, wherein each online service workflow includes one or more workflow steps that cause the online service to perform one or more specified operations that produce observable outcomes within a specified amount of time specified by the online service provider;
an act of executing at least one of the received online service workflows;
an act of abandoning execution of the online service workflow if execution is not completed within the specified amount of time;
an act of comparing the outcomes of the workflow execution to the received expected outcomes corresponding to the executed online service workflow;
an act of propagating messages through one or more communication systems to notify the online service provider if one or more expected outcomes were not reached;
an act of generating a report that includes the results of the comparison; and
an act of instantiating a scheduler to assign one or more online service workflows to at least one of the networked computers for automatic execution on a specified basis
wherein the one or more online service workflows comprise real or simulated customer scenarios at an online service and executed continuously on a periodic or on-demand basis to monitor the online service in the production environment.

15. The computer system of claim 14, wherein the workflow is executed when the online service is deployed into a staging environment.

16. A computer system comprising the following:
one or more processors;
system memory;
one or more computer-readable storage media having stored thereon computer-executable instructions that, when executed by the one or more processors, causes the computing system to perform a method for verifying the accessibility and functionality of an online service, the method comprising the following:
an act of receiving from an online service provider one or more online service workflows and one or more corresponding expected outcomes for each workflow, each online service workflow being associated with an online service, wherein each online service workflow includes one or more workflow steps that cause the online service to perform one or more specified operations that produce observable outcomes within a specified amount of time specified by the online service provider;
an act of executing at least one of the received online service workflows;
an act of abandoning execution of the online service workflow if execution is not completed within the specified amount of time;
an act of comparing the outcomes of the workflow execution to the received expected outcomes corresponding to the executed online service workflow;
an act of propagating messages through one or more communication systems to notify the online service provider if one or more expected outcomes were not reached;
an act of generating a report that includes the results of the comparison, wherein a scheduler is implemented to assign one or more online service workflows to at least one networked computer system for automatic execution on a periodic basis; and
an act of monitoring the ongoing execution of online service workflows to determine whether the online service workflows are being executed properly.

17. The computer system of claim 16, wherein the online service workflow are received from at least two different types of software application.

* * * * *